United States Patent
Cleaver et al.

(10) Patent No.: US 12,346,780 B2
(45) Date of Patent: Jul. 1, 2025

(54) ARTIFICIAL INTELLIGENCE MODULE COMMUNICATION

(71) Applicant: KYNDRYL, INC., New York, NY (US)

(72) Inventors: James David Cleaver, Grose Wold (AU); Dallas McGuire Hindle, Williamstown (AU); Michael James McGuire, Sydney (AU); Pramod Vadayadiyil Raveendran, Bengaluru (IN); Seema Nagar, Bangalore (IN)

(73) Assignee: Kyndryl, Inc., New York, NY (US)

( * ) Notice: Subject to any disclaimer, the term of this patent is extended or adjusted under 35 U.S.C. 154(b) by 941 days.

(21) Appl. No.: 17/449,838

(22) Filed: Oct. 4, 2021

(65) Prior Publication Data

US 2023/0108391 A1   Apr. 6, 2023

(51) Int. Cl.
| | | |
|---|---|---|
| G06F 17/00 | (2019.01) | |
| G06F 7/00 | (2006.01) | |
| G06F 16/951 | (2019.01) | |
| G06F 16/9538 | (2019.01) | |
| G06N 20/00 | (2019.01) | |

(52) U.S. Cl.
CPC ........... *G06N 20/00* (2019.01); *G06F 16/951* (2019.01); *G06F 16/9538* (2019.01)

(58) Field of Classification Search
CPC .... G06N 20/00; G06F 16/951; G06F 16/9538
USPC ...................................................... 707/709
See application file for complete search history.

(56) References Cited

U.S. PATENT DOCUMENTS

| 10,116,596 | B2 | 10/2018 | Li | |
|---|---|---|---|---|
| 10,659,851 | B2 | 5/2020 | Lister | |
| 10,742,572 | B2 | 8/2020 | Anderson | |
| 2018/0287968 | A1 | 10/2018 | Koukoumidis | |
| 2018/0332167 | A1 | 11/2018 | Lu | |
| 2020/0372402 | A1* | 11/2020 | Kursun | G06N 3/088 |
| 2020/0394190 | A1 | 12/2020 | Chaudhuri | |
| 2021/0027136 | A1* | 1/2021 | Hwang | G06F 9/542 |

(Continued)

OTHER PUBLICATIONS

Anghelescu, Petre et al.; Chatbot Application using Search Engines and Teaching Methods; ECAI 2018—International Conference—10th Edition; Electronics, Computers and artificial Intelligence; Jun. 28-30, 2018; 6 pages.

(Continued)

*Primary Examiner* — Pavan Mamillapalli

(74) *Attorney, Agent, or Firm* — CANTOR COLBURN LLP; Erik Swanson

(57) ABSTRACT

A system, method, and computer program product for implementing artificial intelligence module communication is provided. The method includes generating models associated with communications between real-time artificial intelligence modules. Classifiers associated with the models are generated and a master real-time artificial intelligence module associated with the modules and classifiers is detected. Real-time artificial intelligence modules are detected and communications between the master real-time artificial intelligence module and the real-time artificial intelligence modules are initiated. Updated classifiers, updated models, and updated self learning software are generated. The updated self learning software is executed and a resulting query associated with a Web search is executed.

18 Claims, 7 Drawing Sheets

(56) References Cited

U.S. PATENT DOCUMENTS

2021/0049217 A1\* 2/2021 Ogawa ................... G06N 5/04
2021/0141820 A1 5/2021 Vora

OTHER PUBLICATIONS

Kalyan, Parimi Shiva et al.; Increasing the Efficiency of Outcome in Chatbot by Applying Embedded Search Engine; International Conference on Recent Innovations in Electrical, Electronics & Communication Engineering; Jul. 2018; 6 pages.

Mell, Peter et al.; "The NIST Definition of Cloud Computing;" National Institute of Standards and Technology; Special Publication 800-145; Sep. 2011; 7 pages.

\* cited by examiner

ARTIFICIAL INTELLIGENCE MODULE COMMUNICATION

BACKGROUND

The present invention relates generally to a method for initiating real-time artificial intelligence module communications and in particular to a method and associated system for improving software and artificial intelligence based Website technology associated with detecting and initiating communications between artificial intelligence modules and generating and executing updated self-learning software for execution of a query associated with a Web search.

SUMMARY

A first aspect of the invention provides a hardware device comprising a processor coupled to a computer-readable memory unit, the memory unit comprising instructions that when executed by the processor implements a real-time artificial intelligence module communication method comprising: models associated with communications between real-time artificial intelligence modules; generating, by the processor, classifiers associated with the models; detecting, by the processor, a master real-time artificial intelligence module associated with the models and the classifiers; detecting, by the processor executing Web crawling software during a Web crawling process, a plurality of real-time artificial intelligence modules; initiating, by the processor with respect to computer language rules, communications between the master real-time artificial intelligence module and the plurality of real-time artificial intelligence modules; generating, by the processor in response to results of the communications, updated classifiers associated with the classifiers; generating, by the processor in response to results of the communications and with respect to the updated classifiers, updated models associated with the models; generating, by the processor in response to results of the communications and with respect to the updated models, updated self-learning software for execution of the communications between the master real-time artificial intelligence module and the plurality of real-time artificial intelligence modules; executing, by the processor, updated self-learning software; and executing, by the processor in response to user input with respect to the executing the updated self-learning software, a query associated with a Web search.

A second aspect of the invention provides a real-time artificial intelligence module communication method comprising: generating, by a processor of a hardware device, models associated with communications between real-time artificial intelligence modules; generating, by the processor, classifiers associated with the models; detecting, by the processor, a master real-time artificial intelligence module associated with the models and the classifiers; detecting, by the processor executing Web crawling software during a Web crawling process, a plurality of real-time artificial intelligence modules; initiating, by the processor with respect to computer language rules, communications between the master real-time artificial intelligence module and the plurality of real-time artificial intelligence modules; generating, by the processor in response to results of the communications, updated classifiers associated with the classifiers; generating, by the processor in response to results of the communications and with respect to the updated classifiers, updated models associated with the models; generating, by the processor in response to results of the communications and with respect to the updated models, updated self-learning software for execution of the communications between the master real-time artificial intelligence module and the plurality of real-time artificial intelligence modules; executing, by the processor, updated self-learning software; and executing, by the processor in response to user input with respect to the executing the updated self-learning software, a query associated with a Web search.

A third aspect of the invention provides a computer program product, comprising a computer readable hardware storage device storing a computer readable program code, the computer readable program code comprising an algorithm that when executed by a processor of a hardware device implements a real-time artificial intelligence module communication method, the method comprising: generating, by a processor of a hardware device, models associated with communications between real-time artificial intelligence modules; generating, by the processor, classifiers associated with the models; detecting, by the processor, a master real-time artificial intelligence module associated with the models and the classifiers; detecting, by the processor executing Web crawling software during a Web crawling process, a plurality of real-time artificial intelligence modules; initiating, by the processor with respect to computer language rules, communications between the master real-time artificial intelligence module and the plurality of real-time artificial intelligence modules; generating, by the processor in response to results of the communications, updated classifiers associated with the classifiers; generating, by the processor in response to results of the communications and with respect to the updated classifiers, updated models associated with the models; generating, by the processor in response to results of the communications and with respect to the updated models, updated self-learning software for execution of the communications between the master real-time artificial intelligence module and the plurality of real-time artificial intelligence modules; executing, by the processor, updated self-learning software; and executing, by the processor in response to user input with respect to the executing the updated self-learning software, a query associated with a Web search.

The present invention advantageously provides a simple method and associated system capable of automating real-time artificial intelligence module communications.

DETAILED DESCRIPTION

Figure 1:
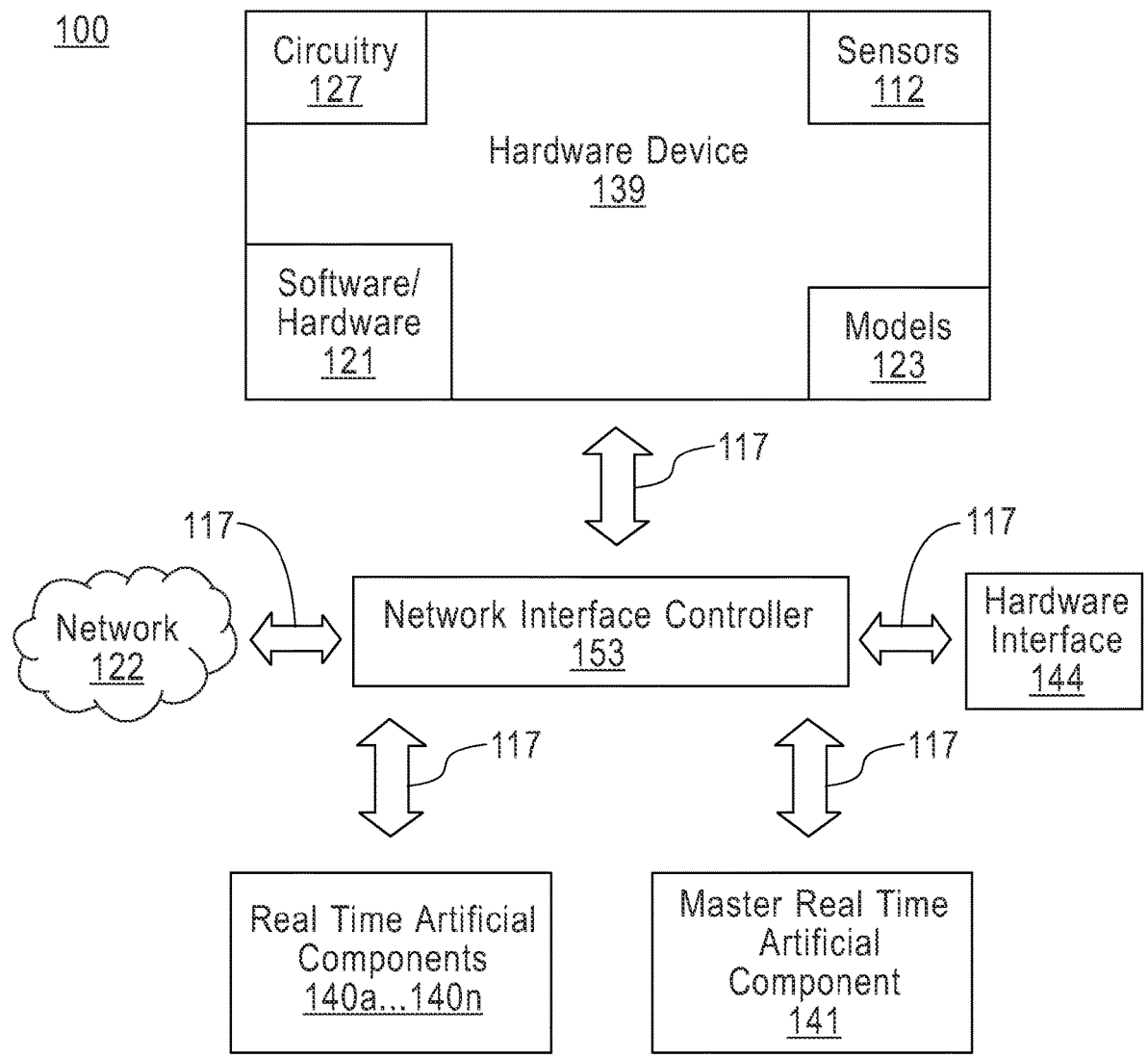
FIG. 1 illustrates a system for improving software and artificial intelligence based Website technology associated with detecting and initiating communications between artificial intelligence modules and generating and executing updated self-learning software for execution of a query associated with a Web search, in accordance with embodiments of the present invention.

FIG. 1 illustrates a system 100 for improving software and artificial intelligence based Website technology associated with detecting and initiating communications between artificial intelligence modules and generating and executing updated self-learning software for execution of a query associated with a Web search, in accordance with embodiments of the present invention. Typical search engines are well established for collecting information from websites. Likewise, chat bots are enabled for providing a unique experience with respect to a window associated with data that is unavailable through standard Website technology including access to real time information. For example, a user may request to purchase a specified laptop computer comprising a configuration X tomorrow. The user may additionally request a location and price for purchase of the specified laptop computer and a delayed response is provided. Therefore, system 100 is configured to use personalized information (e.g., location information) to determine retailers in the area and enable a chat bot interface of the retailers to determine exact real time stock availability for that configuration and associated price.

System 100 is configured to provide enhanced search capability to access real-time personalized data of chatbots to simplify and personalize a user experience.

System 100 enables the following functionality:
1. Discovering chatbots (i.e., artificial intelligence modules) such that hardware device 139 determines that a chatbot exists within a website. Likewise, system 100 is configured to invoke the chat bots.
2. Classifying chatbots such that metadata and an associated taxonomy of the chatbots are collected after the chatbots are identified.
3. Determining data available through a chatbot such that an initial set of questions is preloaded based on a classification. Likewise, system 100 is configured to provide metadata comprising a catalogue of services/products/queries that may be addressed via the chatbot.
4. Determining language required to interrogate a chatbot. Interrogating a chatbot may include preloading an initial set of questions based on a classification and generating self-learning code based on responses to the questions.
5. Ranking a relevance of the chat bots in advance of a user query. Outcomes from previous chatbot queries may be used for generating the self-learning code.
6. Ranking an output of real time chatbot queries in response to a user query). A current ranking relies on historical credence and may be updated for real time data collection.
7. Usage of multiple chatbots (e.g., stacked queries) to form an overall optimized response.

System 100 of FIG. 1 includes a hardware device 139, real-time artificial intelligence components (modules) 140*a* . . . 140*n*, a master real-time artificial intelligence component (module) 141, a hardware interface 144, and a network interface controller interconnected through a network 7. Hardware 139 device comprises sensors 112, circuitry 127, and software/hardware 121. Hardware interface may comprise any type of hardware based interface including, inter alia, a virtual reality interface, a graphical user interface, etc. Hardware device 139, real-time artificial intelligence components (modules) 140*a* . . . 140*n*, and master real-time artificial intelligence component (module) 141 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139, real-time artificial intelligence components (modules) 140*a* . . . 140*n*, and master real-time artificial intelligence component (module) 141 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software and artificial intelligence based Website technology associated with detecting and initiating communications between artificial intelligence modules and generating and executing updated self-learning software for execution of a query associated with a Web search. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a pre configuration process as follows:

A search engine determines that a Website (or Webpage) hosts a chat bot. A purpose for the Website is determined and the chatbot is classified based on a pre-configured understanding of chatbot types (e.g., retail chatbot, banking chatbot, hardware/software control chatbot, etc.). Based on the chatbot classification, system 100 enables a pre-built set of questions to:
1. Determine availability for a set of products/services.
2. Determine information required to facilitate the set of products/services.
3. Determine an associated outcome (e.g., a quote, a delivery, information for a product or service, etc.).

A resulting catalog and semantic search mechanism/code is generated.

System 100 is enabled to execute a query process as follows:

During query execution, the search engine (comprising preconfigured personal information) identifies a query type and uses the resulting catalog to determine necessary information and relevant cataloged Websites. If it is determined that information is missing, system 100 may request additional information recorded for additional later use. Subsequently, system 100 initiates communications with multiple chatbots associated with identified suppliers/vendors/Websites and a result is returned to a user.

Figure 2:
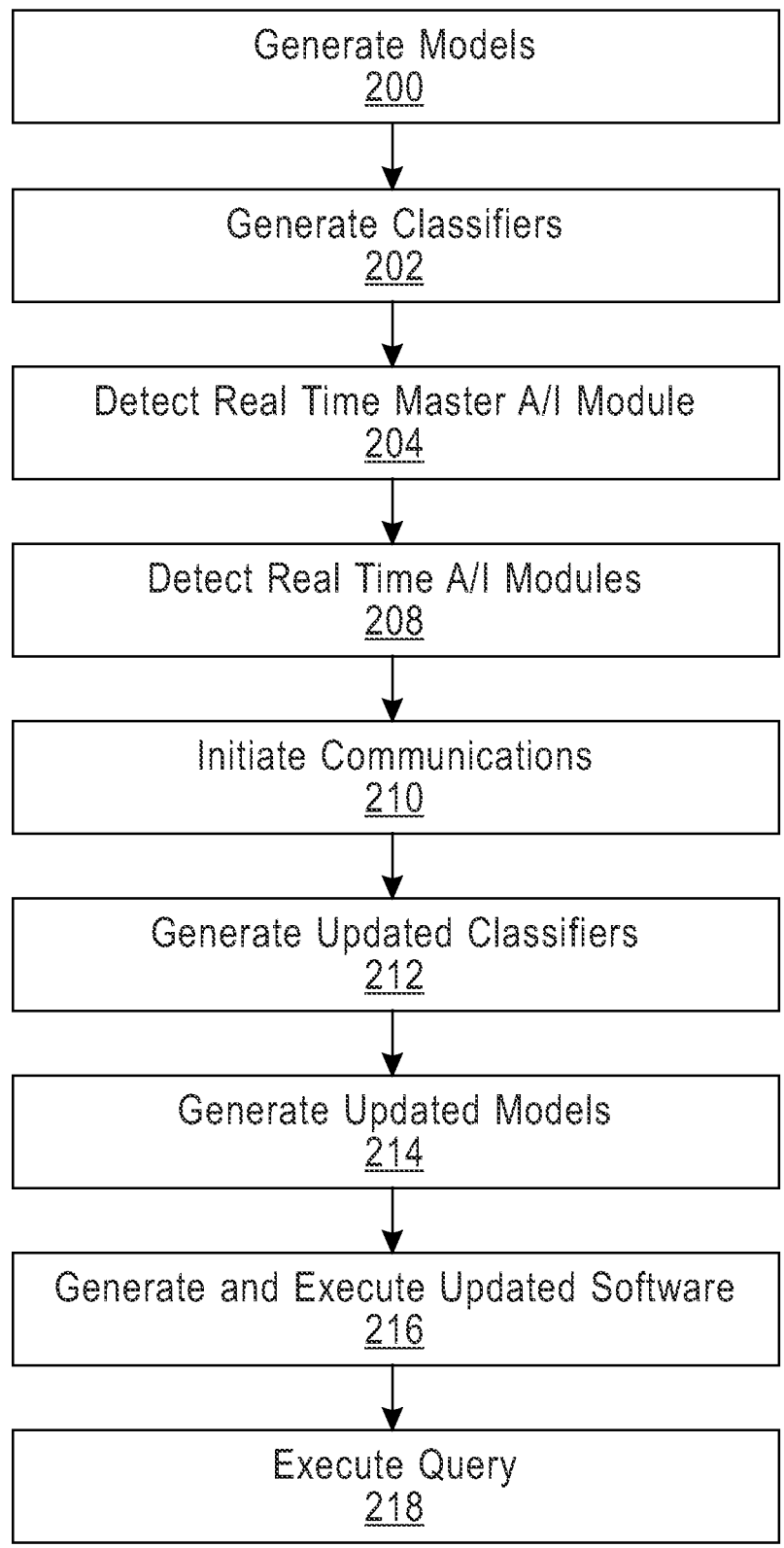
FIG. 2 illustrates an algorithm detailing a process flow enabled by the system of FIG. 1 for improving software and artificial intelligence based Website technology associated with detecting and initiating communications between artificial intelligence modules and generating and executing updated self-learning software for execution of a query associated with a Web search, in accordance with embodiments of the present invention.

FIG. 2 illustrates an algorithm detailing a process flow enabled by system 100 of FIG. 1 for improving software and artificial intelligence based Website technology associated with detecting and initiating communications between artificial intelligence modules and generating and executing updated self-learning software for execution of a query associated with a Web search, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139, real-time artificial intelligence components (modules) 140*a* . . . 140*n*, master real-time artificial intelligence component (module) 141, and a hardware interface 144 of FIG. 1. In step 200, models associated with communications between real-time artificial intelligence modules are generated. In step 202, classifiers associated with the models are generated. Generating the classifiers may include:

1. Determining an availability for a functionality of a Web page with respect to the query;
2. Determining required information for facilitating the functionality of the Web page.
3. Determining an outcome associated with the functionality of the Web page.

The outcome may be associated with a quote, a delivery, or information associated with a product or service.

In step 204, a master real-time artificial intelligence module associated with the models and classifiers is detected. In step 208, a plurality of real-time artificial intelligence modules are detected via execution of Web crawling software during a Web crawling process. The master real-time artificial intelligence module and the plurality of real-time artificial intelligence modules may include, inter alia, chatbot modules.

In step 210, communications between the master real-time artificial intelligence module and the plurality of real-time artificial intelligence modules are initiated with respect to computer language rules. In step 212, updated classifiers associated with the classifiers are generated in response to the communications. In step 214, updated models associated with the models are generated in response to results of the communications and with respect to the updated classifiers. In step 216, updated self-learning software for execution of the communications between the master real-time artificial intelligence module and the plurality of real-time artificial intelligence modules is generated in response to the updated models. The updated self-learning software is executed. In step 218, a query associated with a Web search is executed in response to user input with respect to executing the updated self-learning software. Executing the query may include:

1. Parsing semantics associated with indexing functionality of the master real-time artificial intelligence module and the plurality of real-time artificial intelligence modules.
2. Parsing code based language of the master real-time artificial intelligence module and the plurality of real-time artificial intelligence modules.
3. Executing a real time query of the master real-time artificial intelligence module.
4. Querying (via the master real-time artificial intelligence module in response to executing the real time query) the plurality of real-time artificial intelligence modules.
5. Retrieving (in response to results of querying the plurality of real-time artificial intelligence modules) search results of the query.
6. Presenting (to a user via a specialized graphical user interface (GUI)) the search results such that the user may perform an intended function or initiated control of hardware/software implemented processes.

The specialized GUI may include a virtual reality (VR) interface device. The query executed in step 218 may further include determining (based on results of analyzing the search results) that relevant information is missing from query based information of the search results and (in response) additional information associated with the query based information may be requested. Alternatively, the query executed in step 218 may further include determining (based on results of analyzing the search results) that query based information of the search results includes all necessary information and (in response) the updated self-learning software and additional A/I software modules associated with suppliers, vendors, and Websites (identified in response to executing the real time query) may be enabled for providing software/hardware functionality.

Figure 3:
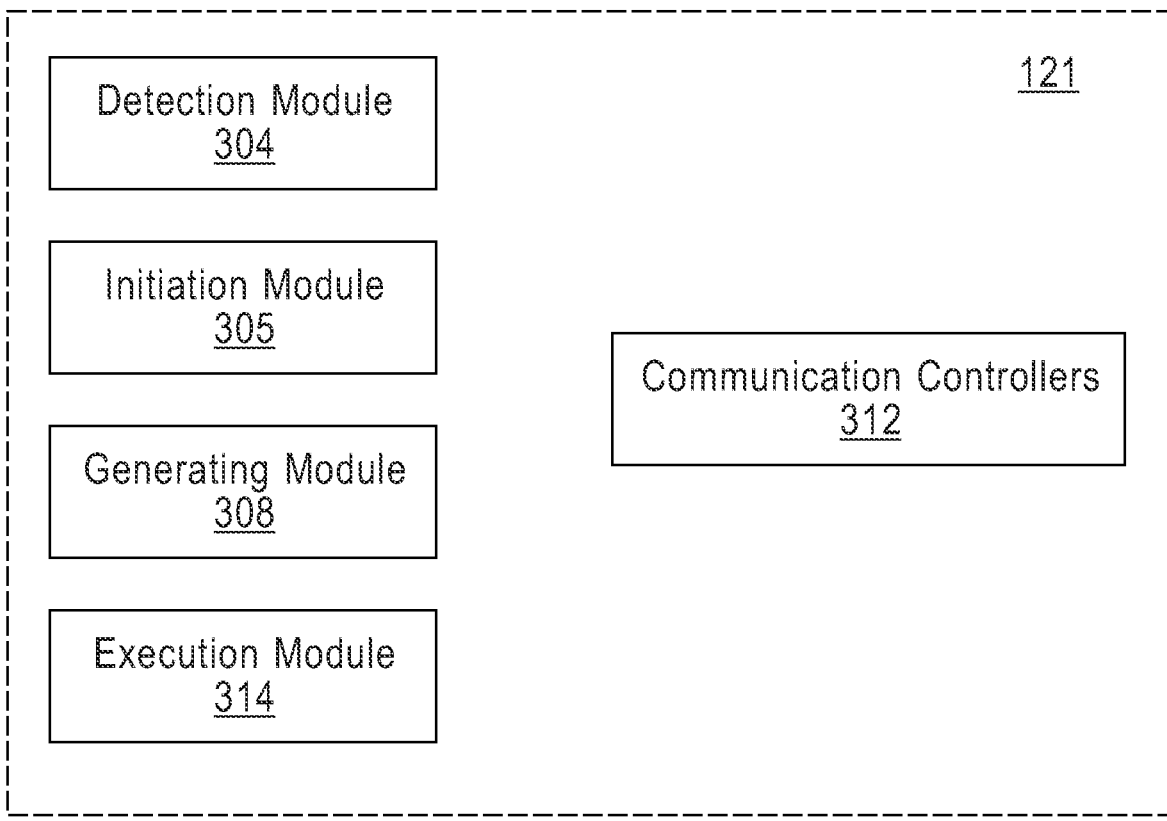
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes a detection module 304, an initiation module 305, a generating module 308, an execution module 314, and communication controllers 312. Detection module 304 comprises specialized hardware and software for controlling all functions related to the detection of steps of FIG. 2. Initiation module 305 comprises specialized hardware and software for controlling all functionality related to the initiating steps described with respect to the algorithm of FIG. 2. Generating module 308 comprises specialized hardware and software for controlling all functions related to the generating steps of FIG. 2. Execution module 314 comprises specialized hardware and software for controlling all functions related to the software/hardware execution steps of the algorithm of FIG. 2. Communication controllers 312 are enabled for controlling all communications between detection module 304, initiation module 305, generating module 308, and execution module 314.

Figure 4:
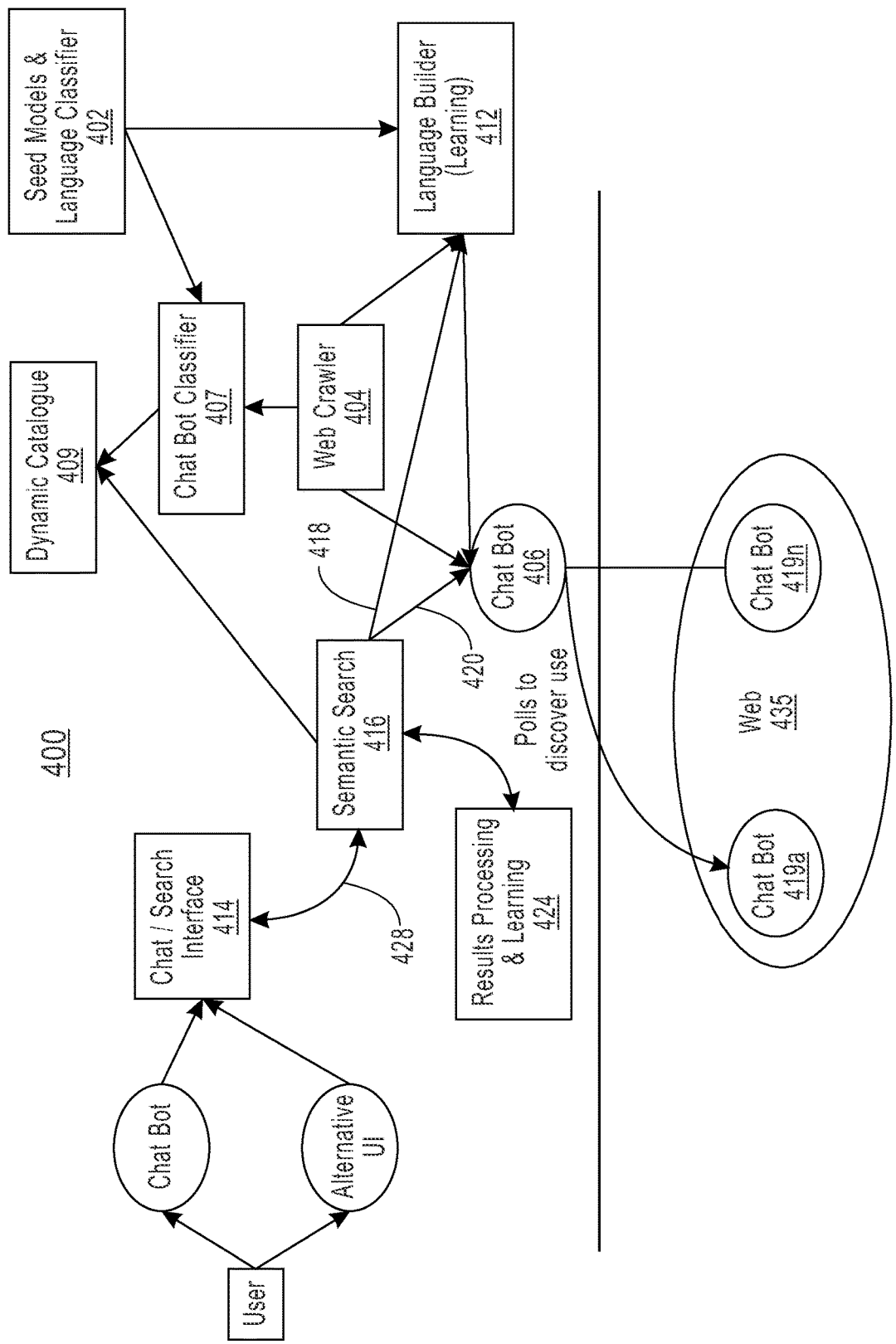
FIG. 4 illustrates a process for initiating setup, indexing, and query functionality, in accordance with embodiments of the present invention.

FIG. 4 illustrates a process 400 for initiating setup, indexing, and query functionality, in accordance with embodiments of the present invention. Process 400 is initiated when models (e.g., initial question, taxonomy, etc.) and classifiers 407 are seeded in step 402. Subsequently, an indexing process is executed as follows:

A Web crawling process 404 is executed (with respect to Websites 435) to locate chatbots 419*a* . . . 419*n* and a master chatbot 406 is instructed to interrogate discovered chatbots according to language rules. The classifiers 407 are updated with updated information and a dynamic catalog 409 is updated with self-learning information/code 412. The self-learning information/code is updated with discovered information. Subsequently, a query process is executed as follows:

In step 428, a query is initiated. In step 416, the query is parsed into semantics of chatbot indexing. In step 418, associated computer language is parsed for clarity. In step 420, a real time query of multiple chatbots is executed for retrieving current information. In step 424, results of the real time query are collated with the rest of the initial query. All results are presented to the user via a chat/search interface 414.

Figure 5:
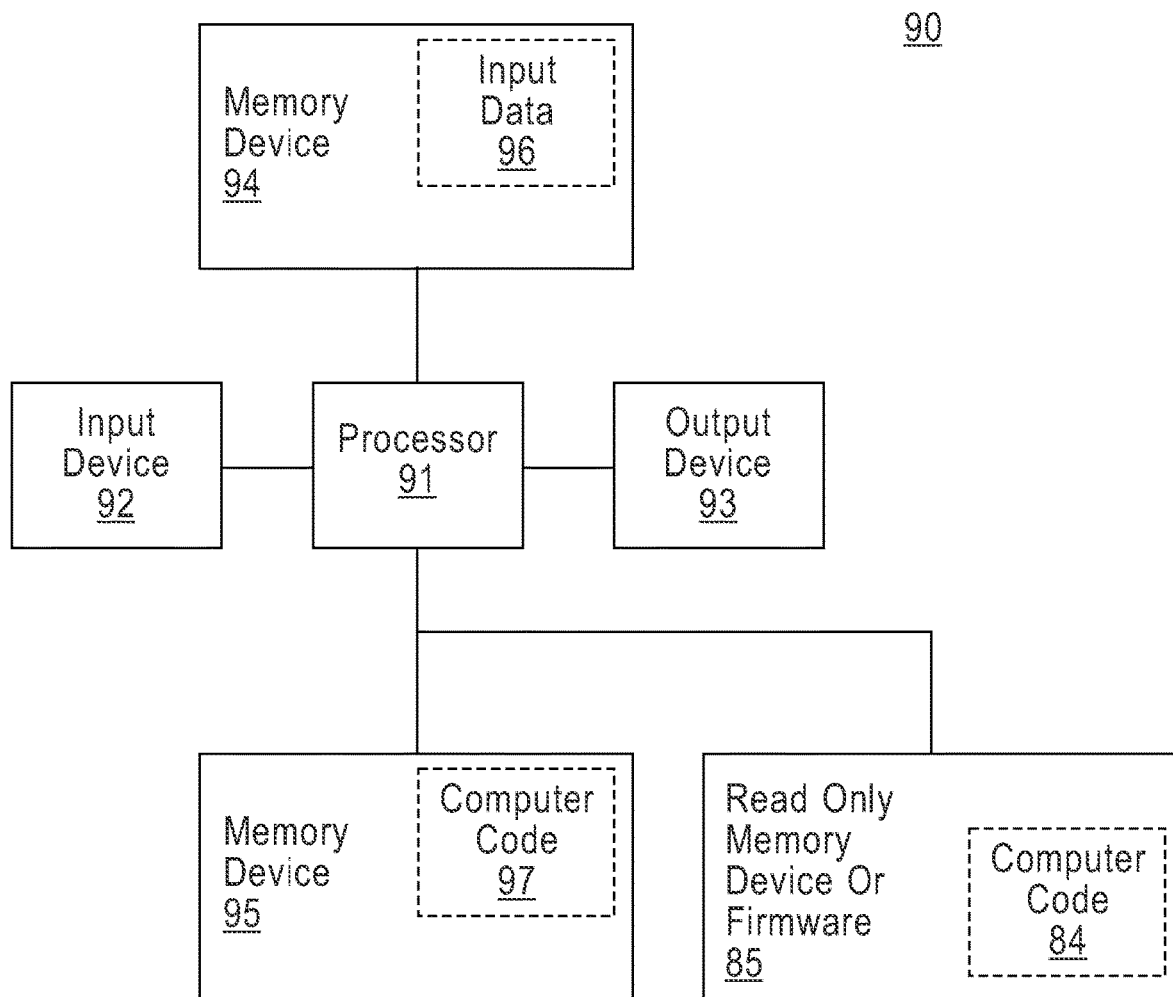
FIG. 5 illustrates a computer system used by the system of FIG. 1 for improving software and artificial intelligence based Website technology associated with detecting and initiating communications between artificial intelligence modules and generating and executing updated self-learning software for execution of a query associated with a Web search, in accordance with embodiments of the present invention.

FIG. 5 illustrates a computer system 90 (e.g., hardware device 139, real-time artificial intelligence components (modules) 140*a* . . . 140*n*, master real-time artificial intelligence component (module) 141, and/or a hardware interface 144 of FIG. 1) used by or comprised by the system 100 of FIG. 1 for improving software and artificial intelligence based Website technology associated with detecting and initiating communications between artificial intelligence modules and generating and executing updated self-learning software for execution of a query associated with a Web search, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 4) for improving software and artificial intelligence based Website technology associated with detecting and initiating communications between artificial intelligence modules and generating and executing updated self-learning software for execution of a query associated with a Web search. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIGS. 2 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and artificial intelligence based Website technology associated with detecting and initiating communications between artificial intelligence modules and generating and executing updated self-learning software for execution of a query associated with a Web search. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and artificial intelligence based Website technology associated with detecting and initiating communications between artificial intelligence modules and generating and executing updated self-learning software for execution of a query associated with a Web search. In another embodiment, the invention provides a business method that performs the process steps of the invention on a subscription, advertising, and/or fee basis. That is, a service supplier, such as a Solution Integrator, could offer to enable a process for improving software and artificial intelligence based Website technology associated with detecting and initiating communications between artificial intelligence modules and generating and executing updated self-learning software for execution of a query associated with a Web search. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
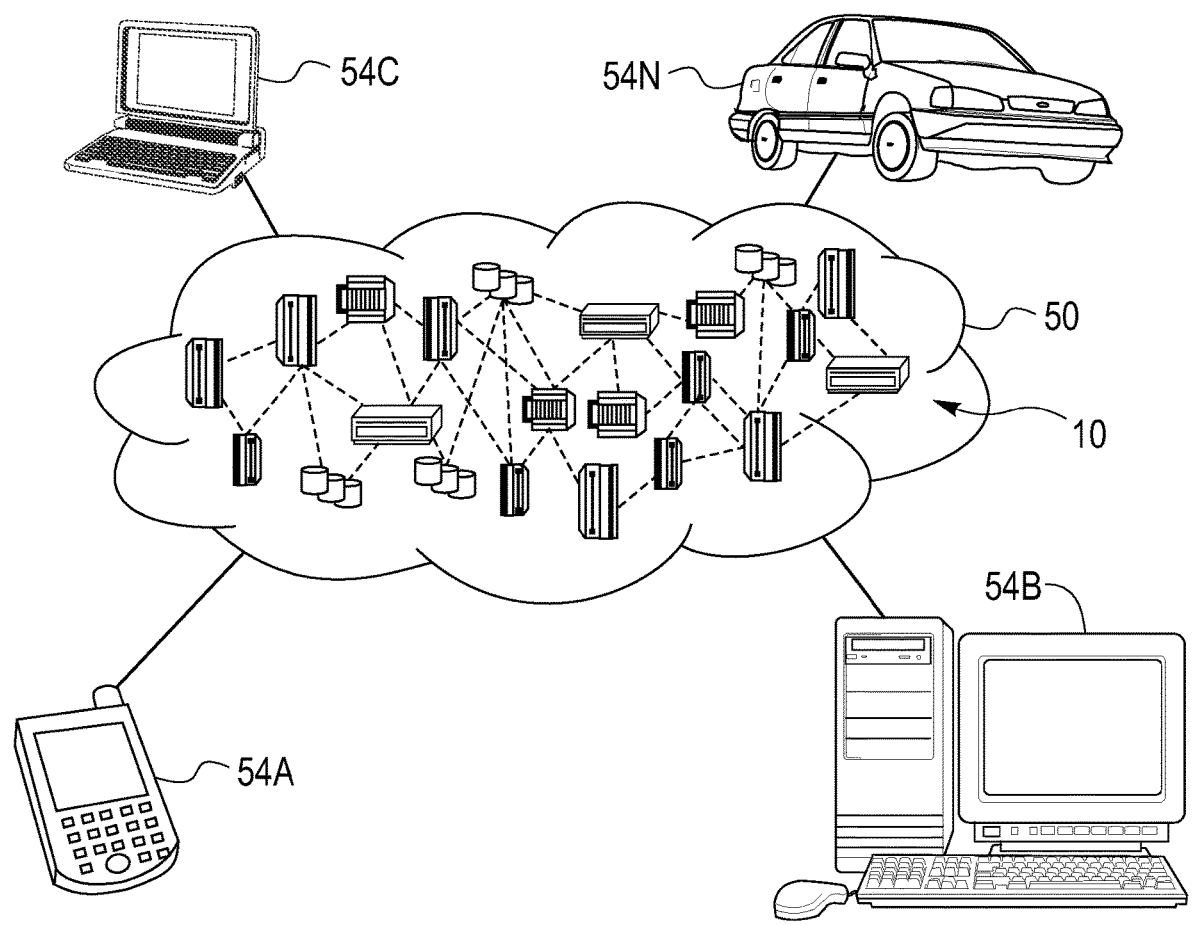
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 7:
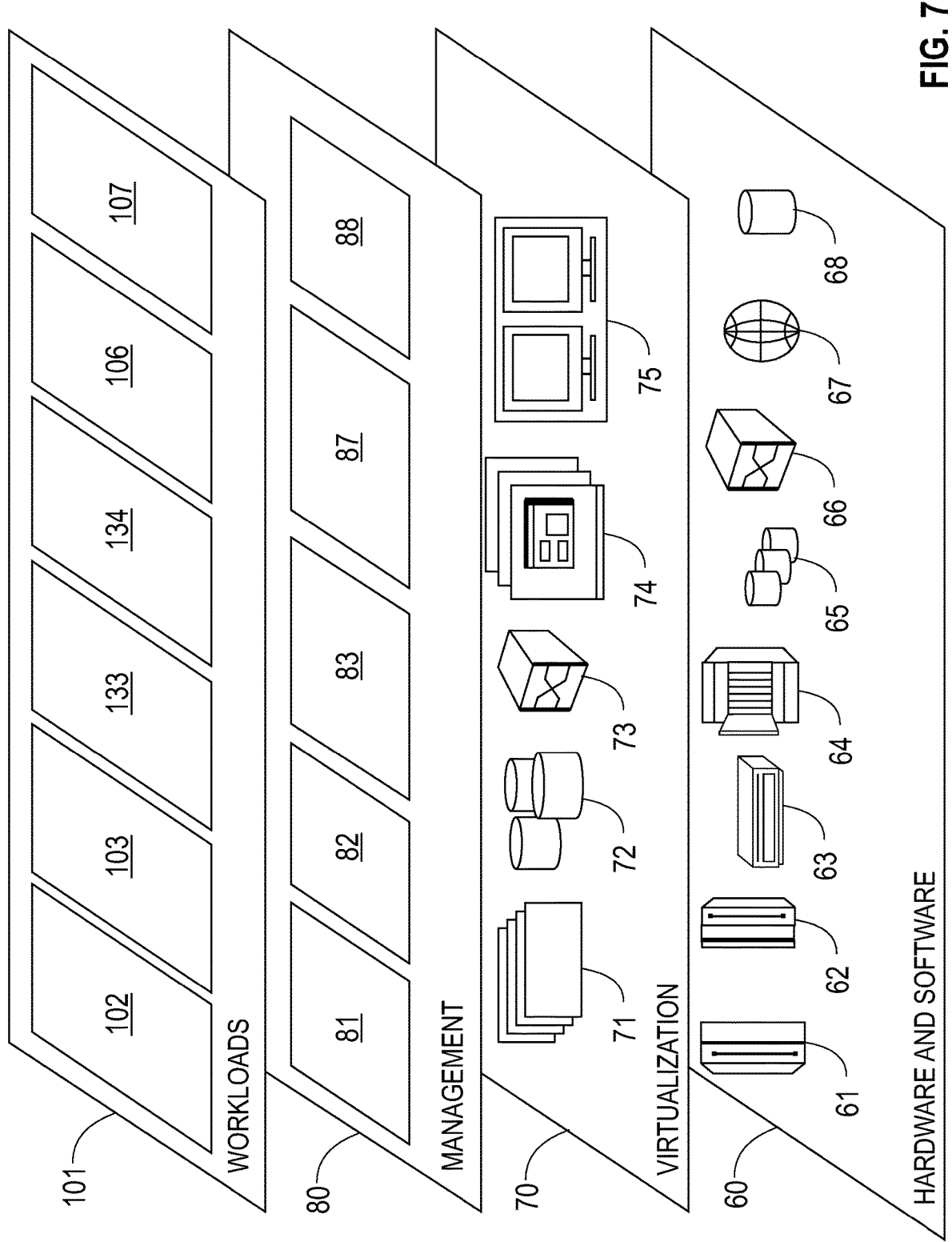
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software and artificial intelligence based Website technology associated with detecting and initiating communications between artificial intelligence modules and generating and executing updated self-learning software for execution of a query associated with a Web search 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hardware device comprising a processor coupled to a computer-readable memory unit, the memory unit comprising instructions that when executed by the processor implements a real-time artificial intelligence module communication method comprising:
   generating, by said processor, models associated with communications between real-time artificial intelligence modules;
   generating, by said processor, classifiers associated with said models;
   detecting, by said processor, a master real-time artificial intelligence module associated with said models and said classifiers;
   detecting, by said processor executing Web crawling software during a Web crawling process, a plurality of real-time artificial intelligence modules;
   wherein said master real-time artificial intelligence module and said plurality of real-time artificial intelligence modules comprise chatbot modules;
   initiating, by said processor with respect to computer language rules, communications between said master real-time artificial intelligence module and said plurality of real-time artificial intelligence modules;
   generating, by said processor in response to results of said communications, updated classifiers associated with said classifiers;
   generating, by said processor in response to results of said communications and with respect to said updated classifiers, updated models associated with said models;
   generating, by said processor in response to results of said communications and with respect to said updated models, updated self learning software for execution of said communications between said master real-time artificial intelligence module and said plurality of real-time artificial intelligence modules;
   executing, by said processor, updated self learning software; and
   executing, by said processor in response to user input with respect to said executing said updated self learning software, a query associated with a Web search.

2. The hardware device of claim 1, wherein said executing said query comprises:
   parsing semantics associated with indexing functionality of said master real-time artificial intelligence module and said plurality of real-time artificial intelligence modules;
   parsing code based language of said master real-time artificial intelligence module and said plurality of real-time artificial intelligence modules;
   executing a real time query of said master real-time artificial intelligence module;
   querying, via said master real-time artificial intelligence module in response to said executing said real time query, said plurality of real-time artificial intelligence modules;
   retrieving, in response to results of said querying said plurality of real-time artificial intelligence modules, search results of said query; and
   presenting to a user, via a specialized graphical user interface (GUI), said search results.

3. The hardware device of claim 2, wherein said specialized GUI comprises a virtual reality (VR) interface device.

4. The hardware device of claim 2, further comprising:
   determining, based on results of analyzing said search results, that relevant information is missing from query based information of said search results; and
   requesting, in response to results of said determining, additional information associated with said query based information.

5. The hardware device of claim 2, wherein said method further comprises:
   determining, based on results of analyzing said search results, that query based information of said search results comprises all necessary information; and
   enabling, in response to results of said determining, said updated self learning software and additional A/I software modules associated with suppliers, vendors, and Websites identified in response to said executing said real time query.

6. The hardware device of claim 1, wherein said generating said classifiers comprises:
   determining, by said processor, an availability for a functionality of a Web page with respect to said query;
   determining, by said processor, required information for facilitating said functionality of said Web page; and
   determining, by said processor, an outcome associated with said functionality of said Web page.

7. The hardware device of claim 6, wherein said outcome is associated with a quote, a delivery, or information associated with a product.

8. A real-time artificial intelligence module communication method comprising:
   generating, by a processor of a hardware device, models associated with communications between real-time artificial intelligence modules;
   generating, by said processor, classifiers associated with said models;
   detecting, by said processor, a master real-time artificial intelligence module associated with said models and said classifiers;
   detecting, by said processor executing Web crawling software during a Web crawling process, a plurality of real-time artificial intelligence modules;
   wherein said master real-time artificial intelligence module and said plurality of real-time artificial intelligence modules comprise chatbot modules;
   initiating, by said processor with respect to computer language rules, communications between said master real-time artificial intelligence module and said plurality of real-time artificial intelligence modules;

generating, by said processor in response to results of said communications, updated classifiers associated with said classifiers;

generating, by said processor in response to results of said communications and with respect to said updated classifiers, updated models associated with said models;

generating, by said processor in response to results of said communications and with respect to said updated models, updated self learning software for execution of said communications between said master real-time artificial intelligence module and said plurality of real-time artificial intelligence modules;

executing, by said processor, updated self learning software; and executing, by said processor in response to user input with respect to said executing said updated self learning software, a query associated with a Web search.

9. The method of claim 8, wherein said executing said query comprises:

parsing semantics associated with indexing functionality of said master real-time artificial intelligence module and said plurality of real-time artificial intelligence modules;

parsing code based language of said master real-time artificial intelligence module and said plurality of real-time artificial intelligence modules;

executing a real time query of said master real-time artificial intelligence module;

querying, via said master real-time artificial intelligence module in response to said executing said real time query, said plurality of real-time artificial intelligence modules;

retrieving, in response to results of said querying said plurality of real-time artificial intelligence modules, search results of said query; and presenting to a user, via a specialized graphical user interface (GUI), said search results.

10. The method of claim 9, wherein said specialized GUI comprises a virtual reality (VR) interface device.

11. The method of claim 9, further comprising:

determining, based on results of analyzing said search results, that relevant information is missing from query based information of said search results; and requesting, in response to results of said determining, additional information associated with said query based information; and initiating communication with multiple chatbots associated with identified suppliers, vendors and websites subsequent to requesting the additional information, the communications including communications between the master real-time artificial intelligence module and the multiple chatbots.

12. The method of claim 9, further comprising:

determining, based on results of analyzing said search results, that query based information of said search results comprises all necessary information; and enabling, in response to results of said determining, said updated self learning software and additional A/I software modules associated with suppliers, vendors, and Websites identified in response to said executing said real time query.

13. The method of claim 9, further comprising:

providing at least one support service for at least one of creating, integrating, hosting, maintaining, and deploying computer-readable code in the hardware device, said code being executed by the processor to implement: said generating said models, said generating said classifiers, said detecting said master real-time artificial intelligence module, said detecting said plurality of real-time artificial intelligence modules, said initiating, said generating said updated classifiers, said generating said updated models, said generating said updated self learning software, said executing said updated self learning software, and said executing said query.

14. The method of claim 8, wherein said generating said classifiers comprises:

determining, by said processor, an availability for a functionality of a Web page with respect to said query;

determining, by said processor, required information for facilitating said functionality of said Web page; and determining, by said processor, an outcome associated with said functionality of said Web page.

15. The method of claim 14, wherein said outcome is associated with a quote, a delivery, or information associated with a product.

16. A computer program product, comprising a computer readable hardware storage device storing a computer readable program code, said computer readable program code comprising an algorithm that when executed by a processor of a hardware device implements a real-time artificial intelligence module communication method, said method comprising:

generating, by a processor of a hardware device, models associated with communications between real-time artificial intelligence modules;

generating, by said processor, classifiers associated with said models;

detecting, by said processor, a master real-time artificial intelligence module associated with said models and said classifiers;

detecting, by said processor executing Web crawling software during a Web crawling process, a plurality of real-time artificial intelligence modules;

wherein said master real-time artificial intelligence module and said plurality of real-time artificial intelligence modules comprise chatbot modules;

initiating, by said processor with respect to computer language rules, communications between said master real-time artificial intelligence module and said plurality of real-time artificial intelligence modules;

generating, by said processor in response to results of said communications, updated classifiers associated with said classifiers;

generating, by said processor in response to results of said communications and with respect to said updated classifiers, updated models associated with said models;

generating, by said processor in response to results of said communications and with respect to said updated models, updated self learning software for execution of said communications between said master real-time artificial intelligence module and said plurality of real-time artificial intelligence modules;

executing, by said processor, updated self learning software; and executing, by said processor in response to user input with respect to said executing said updated self learning software, a query associated with a Web search.

17. The computer program product of claim 16, wherein said executing said query comprises:
- parsing semantics associated with indexing functionality of said master real-time artificial intelligence module and said plurality of real-time artificial intelligence modules;
- parsing code based language of said master real-time artificial intelligence module and said plurality of real-time artificial intelligence modules;
- executing a real time query of said master real-time artificial intelligence module;
- querying, via said master real-time artificial intelligence module in response to said executing said real time query, said plurality of real-time artificial intelligence modules;
- retrieving, in response to results of said querying said plurality of real-time artificial intelligence modules, search results of said query; and
- presenting to a user, via a specialized graphical user interface (GUI), said search results.

18. The computer program product of claim 17, wherein said specialized GUI comprises a virtual reality (VR) interface device.

\* \* \* \* \*